No. 677,244. Patented June 25, 1901.
A. F. MADDEN.
SECONDARY BATTERY.
(Application filed Mar. 19, 1901.)
(No Model.) 2 Sheets—Sheet 2.
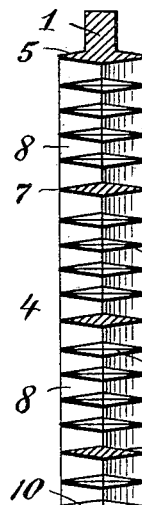
FIG. 5.
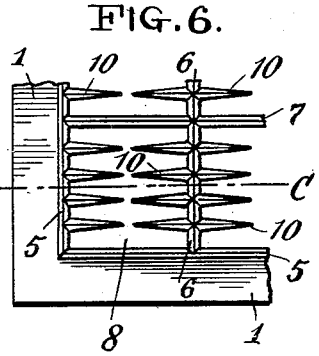
FIG. 6.
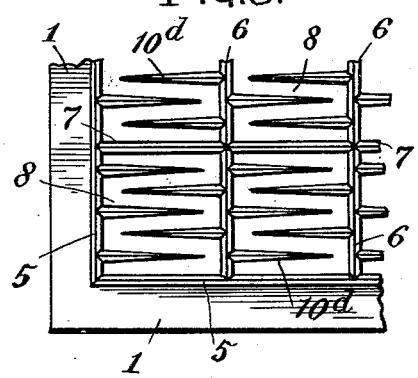
FIG. 8.
FIG. 7.
FIG. 9.
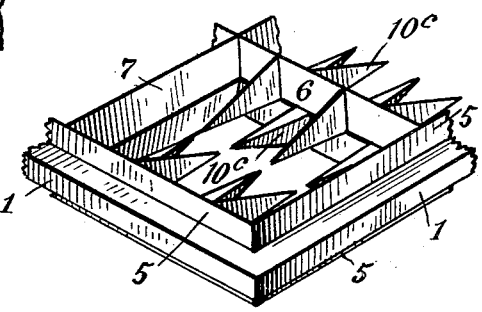
FIG. 10.
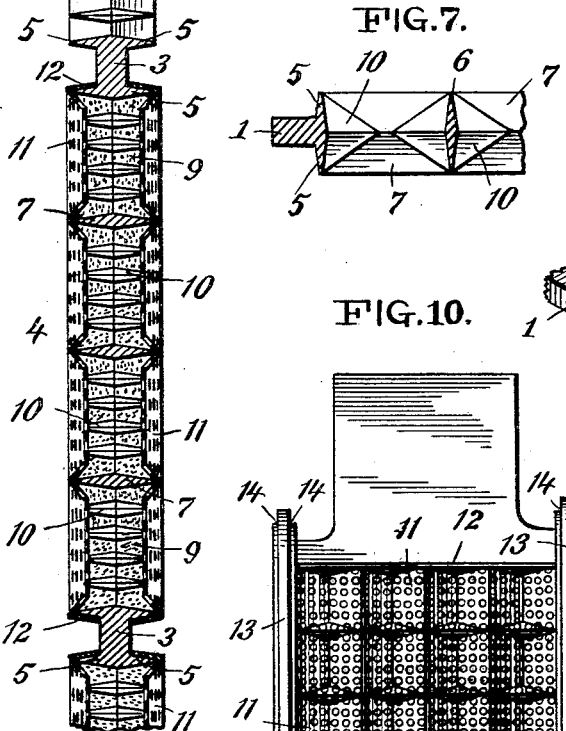
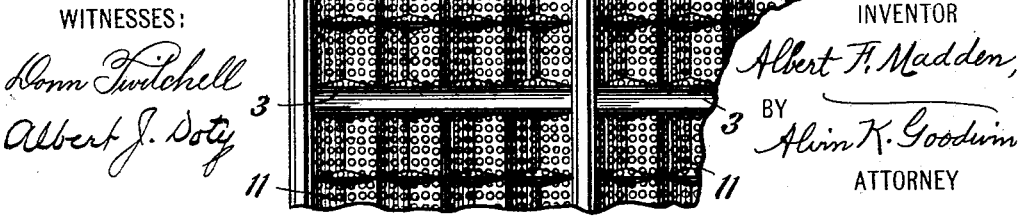
WITNESSES:
Donn Twitchell
Albert J. Doty
INVENTOR
Albert F. Madden,
BY
Alvin K. Goodwin
ATTORNEY
THE NORRIS PETERS CO., PHOTO-LITHO., WASHINGTON, D. C.

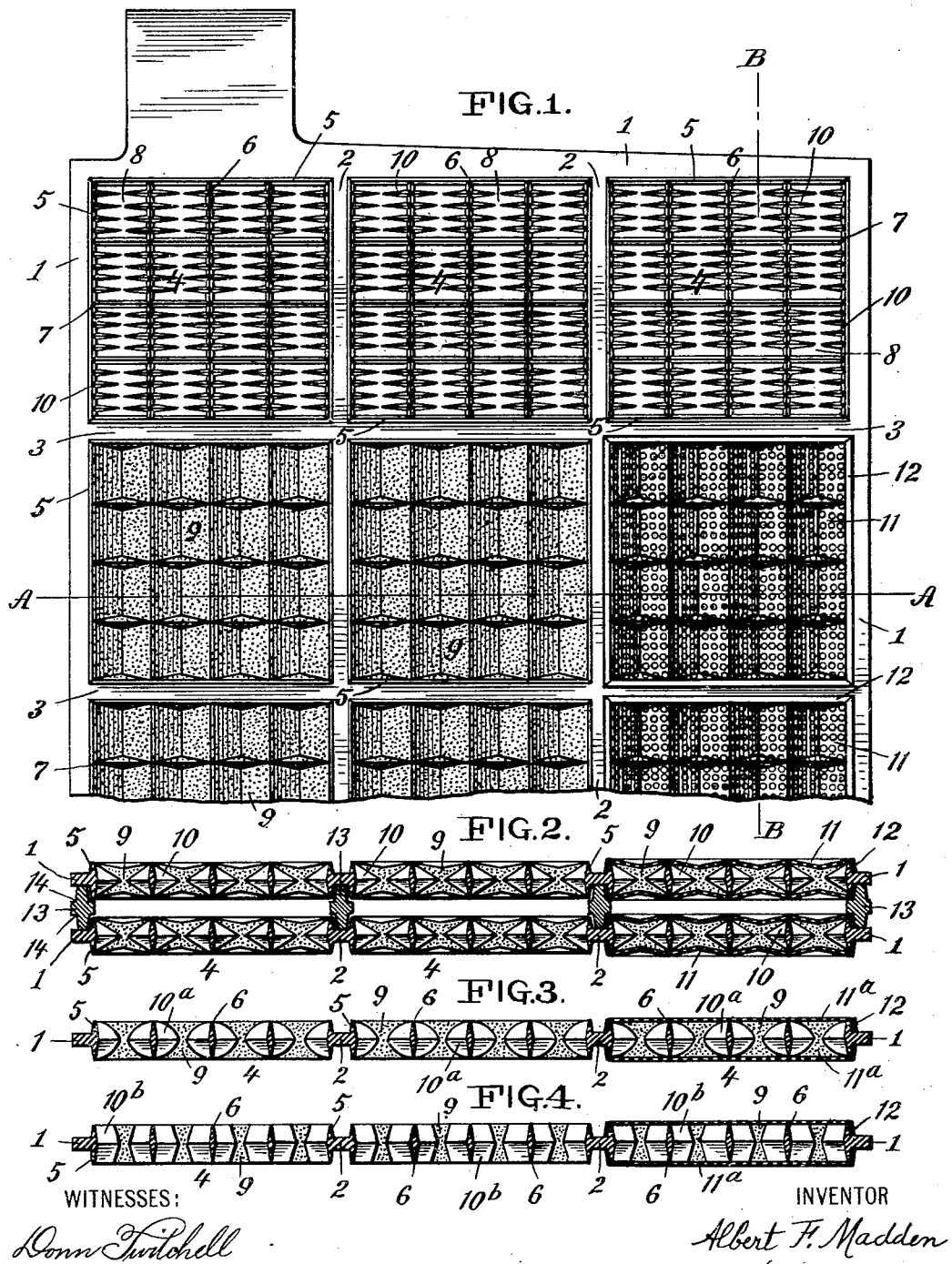

UNITED STATES PATENT OFFICE.

ALBERT FRANKLIN MADDEN, OF NEWARK, NEW JERSEY.

SECONDARY BATTERY.

SPECIFICATION forming part of Letters Patent No. 677,244, dated June 25, 1901.

Application filed March 19, 1901. Serial No. 51,866. (No model.)

*To all whom it may concern:*

Be it known that I, ALBERT FRANKLIN MADDEN, a citizen of the United States of America, residing at the city of Newark, in the county of Essex and State of New Jersey, have invented certain new and useful Improvements in Secondary Batteries, of which the following is a specification.

My invention relates to secondary batteries or accumulators wherein chemical energy is stored by passage of an electric current and from which this energy may be recovered and transformed into an electric current for propelling vehicles or doing other work when the charged battery is connected in circuit with the vehicle-motor or other power-giving appliance or mechanism.

The invention relates more particularly to secondary or storage batteries of the Faure type, but in many features is adapted also to Planté batteries, the object being to provide a secondary battery having maximum storage capacity, minimum weight, and great durability in use.

Reference is made to the accompanying drawings, forming part of this specification, and in which—

Figure 1 is a side elevation of a portion of one of my improved Faure battery-plates with filling material and retainers therefor applied only at its lower openings. Fig. 2 is a plan view in section on the line A A in Fig. 1 of two of such plates with separators between them. Figs. 3 and 4 are sectional plan views showing modified forms of the conductor or grid fingers. Fig. 5 is an enlarged vertical section of the plate or electrode, taken on the line B B in Fig. 1. Fig. 6 is a side view of a lower corner of the conductor; and Fig. 7 is a plan view thereof, taken on the line C C in Fig. 6. Fig. 8 is a detail side elevation illustrating an overlapping arrangement of the conductor-fingers. Fig. 9 is a detail perspective view showing a half-finger construction of the conductor, and Fig. 10 is a side elevation of the upper part of an electrode and the retainers and separators.

Those most skilled in this art rightly believe that storage batteries, notwithstanding their unfortunately large bulk and weight, are very delicate instruments of power. Long experience has proved that very much depends upon the peculiar form and relative proportions of parts and the degree of density of the conductors or grids of battery-plates, as well as upon the nature of the filling or active material influenced by said grids or conductors. This filling material, if applied after the Faure method, is usually reduced by electrolysis to spongy lead preparatory to "charging" the battery. The charging process primarily consists in decomposing the acidulous electrolyte in the battery-cells by passage of an electric current. The oxygen liberated from the electrolyte by this decomposition fills the spongy lead of the negative plates, which thus are peroxidized, while the liberated hydrogen fills the spongy lead of the positive plates, which thus are hydrogenized. When charging is completed, the electric current is cut off, and the battery now is a reservoir of stored chemical energy, which may be transformed into a power-giving electric current. This is effected by "discharging" the battery, which implies connecting its opposite poles in electric circuit. This being done, the oxygen and hydrogen of the plates recombine and the electric current is generated. Charging and discharging of the battery, respectively, cause expansion and contraction of the filling or active material masses of the plates, and more particularly those of the negative or oxygen plates. Should the battery not be in approximately constant use, deposits of sulfates accumulate more or less in the active material, and this partially chokes it and makes it more or less inactive. The expansion attending this sulfation, coupled with that arising from charging and discharging the battery, causes the filling or active material to crack and scale off or disintegrate more or less and fall from the electrodes, and the battery after a shorter or longer time becomes useless. It being presumed that the battery-plates have a large amount of filling or active material in the closest possible contact relations with their conductors or grids and the electrolyte, that storage battery is most effective and economical which if discharged at a given ampere rate to a certain safe degree of exhaustion will admit of charging and discharging the greatest number of times.

The degree of density and purity of the conductive grids or portions of storage-battery plates specially affects the operative efficiency and durability of the plates, more particularly the negative or oxygen plates of a storage battery and partly because very dense and pure grids or conductors longer resist destructive oxidation and longer retain their integrity of form, and they assure maximum conductivity with minimum heating effect and with the least possible bulk and weight of battery material. The operative functions and advantages of a storage battery are materially influenced by even slight changes in the form or relative proportion or arrangement of parts of the conductors or grids of the battery-plates. The dense and pure material of the conductors should be so finely divided at and within the openings which sustain the filling or active material that every part of each filling or body of active material is brought into the most intimate contactual relations with the conductor and the electrolyte and in such a way as to minimize destructive expansion and contraction of the active material, and thus delay its disintegration as long as possible to maintain the battery in efficient operative condition for the longest period. I now will describe a few preferred forms of battery-plate conductor or grid embodying various features of my invention.

First referring more particularly to Figs. 1, 2, 5, 6, and 7 of the drawings, the numeral 1 indicates the outer rim or marginal partition of a preferred form of conductive grid having inner partitions 2 3 crossing, preferably, at right angles and dividing it into main sections 4. The grid may have but one section 4 without the partitions 2 3 or may have any number of said sections with necessary partitions as any desired size of the plate or electrode may require. Each section 4 is bordered by thin webs 5, which project from opposite faces of the strengthening-partitions 1 2 3. Partitions 6 7, preferably thinner than those 2 3, cross the main sections 4 and connect with parts 1 2 3 or 2 3, thus subdividing sections 4 to provide comparatively small transverse openings 8, adapted to hold filling material 9. I prefer to outwardly bevel or taper opposing faces of the parts 5 6 7 to allow said parts to be stripped from dies or molds between or in which the grid or conductor is shaped under compression and preferably by opposing dies set in a hydraulic press.

As shown in the drawings, the grid-openings 8 are each subdivided by the preferred duplex or opposite comb-like series of closely-grouped thin tapering fingers 10, which respectively project from opposite marginal walls of the openings in the general plane of the electrode. It will be understood that but one comb-like series of closely-grouped fine fingers may be used in each opening 8 and so as to project from one marginal wall thereof toward its opposite wall. Each comb-like series of fingers is composed of a number of separate fingers all preferably made quite thin and broad and comparatively long and arranged so that their broader faces oppose and quite closely approach each other, the object being to cause the series of fingers to finely subdivide the filling or active material 9, which is placed or produced around or next them in the grid-openings 8, and thus bring all portions of these fillings into the closest possible conductive relations with the grid and the electrolyte. In the preferred arrangement the base of each conductive finger has a breadth substantially equaling the transverse thickness of the wall of the grid-opening from which it projects. The closely-grouped series of fine fingers provide a very large area of conductive surface, and this would be the case if the fingers had a form different from the preferred long flat broad-faced fingers shown in the drawings. I am not aware of any prior conductor or grid for storage-battery plates having peninsular projections or fingers of any form or having such series of closely-grouped fine fingers projecting into the active-material openings in the general plane of the electrode and integrally produced by compressing the whole structure between dies or within molds as I herein describe and so as to give the conductor or grid throughout its whole mass a practically uniform density greater than could be obtained by any ordinary casting of such grid without special pressure.

There is a special advantage in forming the grid or conductor with comparatively thin partition portions 1 2 3, having webs 5 projecting transversely from them and bordering the grid-sections 4 and the filling-material openings. The comparatively thin solid partitions 1 2 3 have ample strength to support the grid operatively in a battery-cell, and said partitions 1 2 provide true surfaces against or between which may be economically fitted separators of any desired form to space the plates properly in the battery-cell. When the grid-sections 4 are made relatively large, as shown in the drawings, they will have the intersecting partitions 6 7, providing small filling-material openings 8, into which the comb-like series of fine fingers 10 project, as above explained. Should said sections 4 be made much smaller, there may be but one opening within the surrounding webs 5, and the closely-grouped fingers would project from the wall or walls of this opening. In either case the thickness of the active-material-holding portion of the plate is materially increased over that of the grid-partitions 1 2 3, and the webs themselves largely supplement the area of conductive surface supplied by the comb-like series of fine fingers which project from the partitions and webs into the grid-openings.

In accordance with certain features of my invention all the surface-increasing fingers or equivalent projections may have like cross-sectional form from their bases, where they join the grid-partitions, to their extremities; but I prefer to shape the marginal edges of the fingers by beveling or rounding or cutting them away, so as to cause that portion of each finger at or near an approximately central general plane of the plate or conductor to extend farthest into the conductor or grid opening. This cut-away edge formation of the fingers, and especially when the duplex opposing series of fingers are used in each grid-opening, has a fourfold object. First, it carries the finger extremities farthest toward the very heart or transverse center of the fillings 9 to maintain full conductivity thereto; second, it allows the fillings to fasten or lock themselves more securely around the grid-fingers transversely of the electrode; third, it enables me to more surely and easily remove the entire delicately-formed conductor or grid unharmed from the dies or molds between or in which it is compressed to great density; fourth, it promotes economical manufacture of dies which may be satisfactorily used under heavy pressure for a long time. These dies form important parts of an apparatus described and claimed in my companion application having Serial No. 51,867.

One preferred form of the closely-grouped comb-like series of conductive fingers is shown at 10 in Figs. 1, 2, 5, 6, and 7 of the drawings, wherein the fingers are cut away at their side edges to give them a thin arrow-head form. The fingers also may have curved marginal edges ranging from their basal supports 5 6 about to a central general plane of the conductor or grid, as shown at $10^a$ in Fig. 3 of the drawings, or the fingers may have ends beveled slightly and reversely and thin opposite edges, as shown at $10^b$ in Fig. 4, or the fingers may be formed as halves of those shown at 10, $10^a$, or $10^b$, and may project from the supports 5 6 alternately in successively lower planes and at opposite sides or faces of the plate, as sufficiently shown at $10^c$ in Fig. 9 of the drawings. In all these conductive fingers (and in other forms which may suggest themselves) prevails the same operative function of a projection farthest into the openings of the grid or conductor of those portions of the fingers lying at or near a central general plane of the grid or plate. If desired, the fingers may project from their supports in the overlapping or staggered relation shown at $10^d$ in Fig. 8 of the drawings. The preferred transverse double taper or bevel of the fingers from a central general plane of the conductor to its opposite planal faces would cause the fingers to be practically surrounded by the filling or active material, even if the fingers were not marginally cut away at their outer portions, and the edges of the fingers then would show by a narrow or hair line at the opposite faces of the electrode and substantially like the edges of inner portions of the cut-away fingers $10^b$ in the drawings.

I may prefer to so apply the filling material 9 within the grid-openings 8 around the fingers 10 or $10^a$ or $10^c$ as to make the opposite outer faces of this material conform somewhat closely to the general contour of the adjoining cut-away marginal edges of the fingers and as will be understood from Figs. 1 and 2 of the drawings. This gives the filling a corrugated or recessed outer surface formation, against which correspondingly corrugated or recessed and perforated or porous non-conductive retaining-plates or retainers 11 may lie. Said retainers also rest against the edges of the webs 5 and partitions 6 7 of each section 4 of the grid or conductor, as seen at corresponding portions of Figs. 1, 2, 3, 4, and 5 of the drawings. By thus giving the filling material a corrugated or recessed formation I gain the important advantage of having a comparatively thin body of the material along or next the cut-away marginal edges of the fingers, whereby all portions of the filling material are brought into the closest relations with the fingers to realize the best conductive effect of the grid relatively to the filling or active material and the electrolyte. Furthermore, the corrugation of the retainer strengthens it and also tends to strengthen the plate itself when the retainer is applied thereto. The retainers prevent possible washing down of the active material by the battery fluids or possible shaking out of this material by jars incident to travel of a vehicle or from other cause, thus preventing short-circuiting of the battery by dislodged conductive material.

Various means may be adopted for holding the retainers 11 in place at the marginal webs 5 of the conductor; but I prefer to make the retainers with inbent marginal flanges 12, fitting snugly around the webs 5 of each section 4. I also form the separators 13 with rabbeted portions 14, so that said separators not only space the plates properly apart in the battery-cell by acting between the grid-partitions 1 2, but they also preferably overlie the retainers, and thereby securely lock them to the plates and as will be understood from Figs. 2 and 10 of the drawings. Obviously the rabbets 14 of the separators 13 by overlying the retainers directly outside the edges of the web 5 would space the plates apart and also hold the retainers to the fillings 9 if the retainers did not have the flanges 12; but the use of these flanges is preferred to secure a better hold of the retainers on the plate and the more extensive overlocking of the retainers by the separators. The flanges 12 also mutually strengthen the retainers and the conductors and the entire plate. In Figs. 3 and 4 of the drawings perforated retainers $11^a$, having flat or plane surfaces, fit against corresponding flat surfaces of the fillings 9 and the grid portions 5 6 7 and have like inbent flanges 12, fitting the grid-webs 5 and to be overlocked by the separators, substantially as above described. Should the retainers be omitted, plain strip-separators will be used directly between the vertical strengthening-partitions 1 2 of the conductors or grids of opposing battery-plates.

Improvements in storage batteries have been quite slowly developed. Occasionally it is claimed that a new battery has two or three times the power-giving capacity of its predecessors; but it usually appears that this alleged increase of power, if attained at all, is but for very few discharges of the battery, which completely wear it out and prove that prior storage batteries giving much less power at each discharge, but for many discharges, are far more reliable and economical in use. Endurance tests of my battery by competent experts have demonstrated that at a low ampere rate of discharge the battery gives twice the power and at a high ampere rate of discharge it gives two and one-half times the power by comparison with like rated prior storage batteries having filling or active material of quite similar character and effect. Now this marked increase in the efficiency of my battery must have legitimate cause. I believe that this cause lies mainly in the peculiar form and arrangement of the very large conductive surface of the grids of my battery-plates coupled with the practically perfect and superior density and purity of said grids and the very intimate relations sustained between the electrolyte and the finely-subdivided densely-compressed portions of the grid or conductor and the correspondingly finely divided portions of filling or active material sustained by the conductors. It is desirable and perhaps necessary to clearly distinguish between certain features of my invention and kindred features of prior secondary batteries.

It has been heretofore proposed to compress a storage-battery plate conductor or grid by either direct-acting or roller dies or within molds when said conductor or grid had plain or unfingered openings made transversely through it to receive active or filling material. It also is old to produce cast-lead grids or conductors having shorter or longer projections or fingers extending into their filling or active-material openings, as shown, for instance, in United States Patent No. 300,933, which also states that such fingered plates "may consist of sheet-lead, either perforated or intact." Any other method of perforating sheet-lead to produce such an integral conductor or grid, except by at once punching out the openings around all the grid-fingers, would be prohibitively expensive. Punching comparatively soft metal, such as lead, to perfectly form this prior fingered grid or plate is quite impracticable, even if the fingers were many times larger than those of my improved conductor or grid, because the punching would produce broken or disintegrated lower marginal portions of the fingers instead of uniformly consolidating and densely smooth-surfacing the entire outer face or superficial area of the conductor or grid. It is comparatively easy to punch closely-arranged small holes of any form in sheet-lead, because every hole is surrounded by a supporting margin or body of metal which allows withdrawal of the punches; but in attempting to punch out by one operation a fingered soft-metal conductor or grid the fingers, because supported only at one end, will so tenaciously bind on the punch as to make its withdrawal impossible without tearing away or disintegrating either the entire fingers or their portions at and near the upper face of the plate. I believe it would be quite impossible to practically produce a uniformly dense integral lead grid of the form shown in said prior patent by any punching operation, and especially if the plate-fingers have anything like the thin long broad-faced form and be arranged in comb-like closely-grouped series, as in the conductor or grid of my invention. The widest or fundamental distinction between my invention and these old structures is that my conductor or grid is compressed to a practically uniform density greater than that of ordinary cast-lead and has integral projections or fingers extending peninsularly, more or less, into its openings from the marginal walls thereof to largely increase the extremely dense and pure conductive surface in contact with filling or active material placed or produced in said openings. These integral projections of the compressed grid or conductor may have any form or arrangement, but are preferably the comb-like series of closely-grouped fine fingers hereinbefore mentioned. It is obvious that these integrally-compressed projections or fingers are as dense throughout as those parts of the conductor or grid which support them and that the points of junction of the projections or fingers with the supporting marginal walls of the grid-openings are likewise as dense as are said walls or as the projections or fingers themselves. Hence there is a practically perfect density and purity and consequent perfect conductivity of a very large area of my conductor or grid having peninsular projections or fingers extending into its filling or active-material openings which is not attained by any compressed conductor or grid not having such projections or fingers or by any conductor or grid having projections or fingers entering its openings and made by a punching process, or if made by a casting or molding process yielding a product which is comparatively porous in texture and is liable to have many blow-holes, and is also charged with various impurities taken up from the molds or from the active-material pellets themselves should the grid be cast around series of such pellets held in the mold. The very fine subdivision of the filling material of my battery-plates by the closely-grouped comb-like series of fine densely-compressed fingers is most important, as it secures the necessary very large area of effective conductive surface in most intimate contactual relations with the masses of filling or active material in the numerous openings of the grid or conductor and with the electrolyte, thereby promoting maximum capacity and durability of my storage battery. The greater density of the compressed grid also enables it the longer to withstand the strains incident to the expansions and contractions of the electrodes as a whole in use.

In correctly understanding my invention it will be well to consider that the densely-compressed conductor or grid has a series of transverse openings each of which preferably has a quite small area by comparison with the whole area of the electrode. Each opening is adapted to hold a considerable and distinct body of filling or active material, the expansions and contractions of which on charge and discharge are confined, in large measure, to the somewhat-limited area of that opening, and thereby destructive accumulation of the contractions and expansions of the fillings over large areas of the electrode is prevented. Into each of these filling-material openings there extends series of projections or fingers which finely subdivide the body of filling material. When the compression of the conductor or grid to great density by dies or within molds is considered, these projections may have any length or form, provided they be peninsular in character, as distinguished from a ridge commonly formed at the center of unfingered openings of prior conductors simply to give draft for release of patterns used in casting processes or for release from forming dies or molds. For instance, these abrupt peninsular projections may be as long as they are thick, or may be shorter or longer than their thickness if they be integrally formed by densely compressing the conductor or grid, as herein described. For small or medium-sized electrodes I prefer to use comparatively thin peninsular projections in the form of fingers having cylindrical or rectangular or other cross-section and at least as long as they are thick and preferably three or four or more times as long as they are thick to expose the greatest possible area of conductive surface to the active-material fillings of the electrode and to the electrolyte.

There is a marked distinction between my improved conductor or grid and one formed with thin strips, bars, or sheets of lead as long as the entire electrode and connected at one end only to a bar or cross-piece of the conductor and having no filling-material openings or fingers extending therein. In these prior long-strip conductors the expansions and contractions are necessarily greatest at and near the free ends of the strips, and therefore the quick disruption of the active material is promoted at this portion of the electrode, while the active material at and near the fixed ends of the strips will be denied proper degree of contraction and expansion. This unequal ratio of contraction and expansion of the active material at different portions of the strip conductor makes these electrodes lack necessary durability in use.

My invention also materially differs from prior storage-battery electrodes having series of parallel closely-grouped broad-faced thin leaves connected along one edge to a strengthening back or core and intended more particularly for use with Planté active material. Notwithstanding the care with which these thin slightly-spaced leaves are soldered or joined to their support or are shaved or displaced therefrom by a cutter or tool, there occurs an imperfection of junction or an overstraining and partial disruption of the lines of junction of the leaves with their support, which at first seriously interferes with the uniformly-perfect conductivity to the active material and after a time under expanding and contracting influences causes the leaves to break away more or less from their support, and thus ruin the battery. All such weak points or lines of junction of delicate conductive portions influencing the active material are entirely obviated in my compressed conductor.

It also is old to subdivide openings of a storage-battery conductor or grid by partitions connected at opposite ends to bordering-frames, whereby the spaces between adjoining partitions form narrow slots or openings extending through the conductor. These grate-like conductive structures are quite distinct from mine in that they have no independent openings for filling material into which peninsular projections or fingers extend to subdivide the filling material in manner best promoting its durability under the stresses of expansion and contraction. I will more particularly distinguish between my invention and one prior United States patent, No. 487,834, because in this patent the area of each so-called "frame" or "division" of the conductor more nearly approaches in size the area of the filling-material openings of my conductor. It is obvious that with a series of peninsular projections preferably in the form of thin long broad-faced fingers extending into the filling-material openings, as in my conductor each finger may move more or less at its free end. This permits any one or more of the fingers at any particular part of any filling of the conductor to move independently, and thereby accommodate itself to any special localized excessive expansion or contraction at various parts of the active material or filling, and thereby counteract or minimize special local destructive strains which may be set up at any part of any or all fillings of the conductor. Moreover, my invention has a decided advantage over that shown in aforesaid patent, as the sum total of the filling material of the electrode is largely increased, and especially is this the case when the marginal edges of the fingers of my conductor are cut away to give the fingers the preferred farthest projection at or near a central general plane of the electrode. Knowing well the circumstances attending the original production of the grid shown in this Patent No. 487,834, I state that difficulties were experienced in completely filling the very narrow slots or openings of said grid with Faure material, and even if this were perfectly done it was found that during formation only small portions of the fillings at and near the outer faces of the plate were affected and formation did not extend into the center of the fillings, and consequently the electric current was obstructed, especially on discharge and overheating, and sulfation so quickly ensued that the use of this electrode was believed to be impracticable. The advantages of the preferred arrangement of my closely-grouped comb-like series of densely-compressed fine fingers extending independently into the bodies of filling material in the comparatively large openings of the grid or conductor are therefore obvious. Furthermore, this old partitioned grid was formed by rolling lead in a semifluid state or mass into a mold having withdrawable tongues corresponding in cross-section with the area of the openings or slots between the closely-arranged partitions, and the patent also states that the grid may be made from lead in a molten condition molded under pressure. However this prior grid may be produced, its lead conductive material has such a relatively low degree of density that its exterior surface may be readily pitted or honeycombed to permit the thin strips or sheets of lead filling the grid-frames to be all the more easily converted by electrolysis into active material. Now this is the reverse of my intention and practice, as my object is to obtain a storage-battery grid or conductor of great density or one having an interior molecular structure more dense than that of ordinary cast-lead and presenting to subsequently-formed active material a hard-finished exterior surface not adapted to be readily pitted or honeycombed and everywhere adapted to resist quick electrolytic disintegration, said grid having openings within surrounding walls and projections or fingers extending from said walls into the openings to give a very large area of most efficient conductive surface. My grid by its compressed dense interior maintains most effective conductivity relatively to the active material and to the electrolyte and by its very dense hard-finished surface in contact with the active material so long resists destructive oxidation that I can produce a grid or conductor for vehicle storage batteries or other portable uses having much less weight in proportion to its large amount of active material than in many other storage batteries known to me. This prior grid greatly lacked the perfect integrity of form of my grid, which is preferably compressed from a lead sheet or blank and between opposing dies into a practically perfect and very dense structure throughout.

I also wish to distinguish between my invention and another prior-patented storage battery. United States Patent No. 478,661, at Figs. 2 and 3 of the drawings, and German Patent No. 61,656 of 1892, at Fig. 4 of the drawings, show series of short ribs projecting from lozenge or diamond shaped conductive bars or cores and providing between them shallow grooves or recesses into which the active material is placed flush with the outer margins of the ribs, so as to allow free circulation of the electrolyte between and around the ribbed bars, the object being to provide an increased surface of the conductor relatively to the active material and electrolyte over that which would be obtained by similarly-formed plain bars or cores not having the ribs and intervening grooves. These ribs do not project into a body of filling material, closing a transverse opening of the conductor and entirely surrounding projections or fingers, as in a preferred form of my invention.

In forming my improved compressed conductor or grid having peninsular projections or fingers extending into its filling or active-material openings I am not limited to the use of dies acting on a metal blank from which the conductor is die-compressed in the preferred manner, as any other means which will densely compress the metal of such a conductor or grid during its formation in molds or dies and while the metal or material of the grid is either hot or cold may be employed as improvements in these arts may make advisable, provided that suitable means be adopted to recover the compressed conductor or grid unharmed from the shaping molds or dies. There is a special advantage in densely compressing the conductor or grid structure from a metal blank by dies, because during such die-compression ample chance is afforded for escape of air from the metal or dies and there is no injurious pocketing of air, such as often occurs in various portions of conductors or grids formed from fused metal even under pressure in molds. This air-pocketing prevents uniformly-perfect flow or setting of the metal in a mold and the resulting conductor or grid is imperfectly formed and at places has abnormally large openings, later receiving corresponding over-large bodies of filling or active material not having necessary close relations with the conductor and the electrolyte, and therefore liable to quick sulfation, leading to rapid destruction of all adjacent parts of the electrode. By shaping the conductor or grid having aforesaid projections or fingers under die-compression from a blank the conductor has perfect form and substantially like degree of density, especially at its exterior surfaces, which are directly acted on by the dies, which leave these surfaces so smoothly hard-finished all over that they will take a desirable thin coating of oxid, but will at every part resist deep and quickly-destructive oxidation. Furthermore, the active-material openings are of proper normal size, and all the projections or fingers extending into the openings have substantially uniform size and perfect individual form and equal durability and have like effect relatively to the filling material and to the electrolyte throughout the entire electrode during the subtle electrochemical molecular reactions involved in charging and discharging the storage battery.

As shown and hereinbefore described, the conductor or grid has openings 8 extending clear through it, with full fingers 10 projecting into said openings. In making this conductor between special dies under heavy pressure there usually remain very thin partial or complete webs of metal at the central general plane of the conductor. These webs are preferably cut out; but this is not essential to some of the features of my invention.

I claim as my invention—

1. A storage-battery electrode including a conductor or grid having openings within surrounding walls and projections or fingers extending from said walls into the openings, and active material closing the openings and entirely surrounding said projections or fingers.

2. A storage-battery electrode including an integral dense conductor or grid having openings within surrounding walls, and projections or fingers extending from said walls into the openings, and active material closing the openings and entirely surrounding said projections or fingers.

3. An integral compressed storage-battery grid comprising conductive material having an interior molecular structure more dense than that of ordinary cast-lead and presenting a hard-finished exterior surface everywhere adapted to resist quick electrolytic disintegration, said grid having openings within surrounding walls and projections or fingers extending from said walls into the openings.

4. A storage-battery electrode including an integral compressed conductor or grid having an interior molecular structure more dense than that of ordinary cast-lead and presenting a hard-finished exterior surface everywhere adapted to resist quick electrolytic disintegration, said conductor or grid having openings within surrounding walls and projections or fingers extending from said walls into the openings, and active material in the openings in contact with said projections or fingers.

5. An integral compressed storage-battery grid comprising conductive material having an interior molecular structure more dense than that of ordinary cast-lead and presenting a hard-finished exterior surface everywhere adapted to resist quick electrolytic disintegration, said grid having openings within surrounding walls and comb-like series of closely-grouped fine fingers projecting from said walls into the openings.

6. A storage-battery electrode including an integral compressed conductor or grid having an interior molecular structure more dense than that of ordinary cast-lead and presenting a hard-finished exterior surface everywhere adapted to resist quick electrolytic disintegration, said conductor or grid having openings within surrounding walls and comb-like series of closely-grouped fine fingers projecting from said walls into the openings, and active material in the openings in contact with said fingers.

7. An integral dense die-compressed storage-battery conductor or grid having openings within surrounding walls and projections or fingers extending from said walls into the openings.

8. A storage-battery electrode including an integral dense die-compressed conductor or grid having openings within surrounding walls and projections or fingers extending from said walls into the openings, and active material in the openings in contact with said projections or fingers.

9. An integral dense storage-battery conductor or grid die-compressed from opposite sides and having openings within surrounding walls and projections or fingers extending from said walls into the openings.

10. A storage-battery electrode including an integral dense conductor or grid die-compressed from opposite sides and having openings within surrounding walls and projections or fingers extending from said walls into the openings, and active material in the openings in contact with said projections or fingers.

11. A storage-battery electrode including a conductor or grid having openings within surrounding walls and comb-like series of closely-grouped fine fingers projecting from said walls into the openings, and active material closing the openings and entirely surrounding said fingers.

12. An integral dense die-compressed storage-battery conductor or grid having openings within surrounding walls and comb-like series of closely-grouped fine fingers projecting from said walls into the openings.

13. A storage-battery electrode including an integral dense die-compressed conductor or grid having openings within surrounding walls and comb-like series of closely-grouped fine fingers projecting from said walls into the openings, and active material in the openings in contact with said fingers.

14. A storage-battery electrode including a conductor or grid having openings within surrounding walls and comb-like series of closely-grouped thin fingers having broader faces opposing each other and projecting from said walls into the openings, and active material closing the openings and entirely surrounding said fingers.

15. An integral compressed storage-battery grid comprising conductive material having an interior molecular structure more dense than that of ordinary cast-lead and presenting a hard-finished exterior surface everywhere adapted to resist quick electrolytic disintegration, said grid having openings within surrounding walls and comb-like series of closely-grouped thin fingers having broader faces opposing each other and projecting from said walls into the openings.

16. A storage-battery electrode including an integral compressed conductor or grid having an interior molecular structure more dense than that of ordinary cast-lead and presenting a hard-finished exterior surface everywhere adapted to resist quick electrolytic disintegration, said conductor or grid having openings within surrounding walls and comb-like series of closely-grouped thin fingers having broader faces opposing each other and projecting from said walls into the openings, and active material in the openings in contact with said fingers.

17. An integral dense die-compressed storage-battery conductor or grid having openings within surrounding walls and comb-like series of closely-grouped thin fingers having broader faces opposing each other and projecting from said walls into the openings.

18. A storage-battery electrode including an integral dense die-compressed conductor or grid having openings within surrounding walls and comb-like series of closely-grouped thin fingers having broader faces opposing each other and projecting from said walls into the openings, and active material in the openings in contact with said fingers.

19. A storage-battery electrode including a conductor or grid having openings within surrounding walls and two comb-like series of closely-grouped fine fingers respectively projecting into said openings from their opposite marginal walls, and active material closing the openings and entirely surrounding said fingers.

20. An integral compressed storage-battery grid comprising conductive material having an interior molecular structure more dense than that of ordinary cast-lead and presenting a hard-finished exterior surface everywhere adapted to resist quick electrolytic disintegration, said grid having openings within surrounding walls and two comb-like series of closely-grouped fine fingers respectively projecting into said openings from their opposite marginal walls.

21. A storage-battery electrode including an integral compressed conductor or grid having an interior molecular structure more dense than that of ordinary cast-lead and presenting a hard-finished exterior surface everywhere adapted to resist quick electrolytic disintegration, said conductor or grid having openings within surrounding walls and two comb-like series of closely-grouped fine fingers respectively projecting into said openings from their opposite marginal walls, and active material in the openings in contact with said fingers.

22. An integral dense die-compressed storage-battery conductor or grid having openings within surrounding walls and two comb-like series of closely-grouped fine fingers respectively projecting into said openings from their opposite marginal walls.

23. A storage-battery electrode including an integral dense die-compressed conductor or grid having openings within surrounding walls and two comb-like series of closely-grouped fine fingers respectively projecting into said openings from their opposite marginal walls, and active material in the openings in contact with said fingers.

24. A storage-battery electrode including a conductor or grid having openings within surrounding walls and two comb-like series of closely-grouped thin fingers having broader faces opposing each other and respectively projecting into said openings from their opposite marginal walls, and active material closing the openings and entirely surrounding said fingers.

25. An integral compressed storage-battery grid comprising conductive material having an interior molecular structure more dense than that of ordinary cast-lead and presenting a hard-finished exterior surface everywhere adapted to resist quick electrolytic disintegration, said grid having openings within surrounding walls and two comb-like series of closely-grouped thin fingers having broader faces opposing each other and respectively projecting into said openings from their opposite marginal walls.

26. A storage-battery electrode including an integral compressed conductor or grid having an interior molecular structure more dense than that of ordinary cast-lead and presenting a hard-finished exterior surface everywhere adapted to resist quick electrolytic disintegration, said conductor or grid having openings within surrounding walls and two comb-like series of closely-grouped thin fingers having broader faces opposing each other and respectively projecting into said openings from their opposite marginal walls, and active material in the openings in contact with said fingers.

27. An integral dense die-compressed storage-battery conductor or grid having openings within surrounding walls and two comb-like series of closely-grouped thin fingers having broader faces opposing each other and respectively projecting into said openings from their opposite marginal walls.

28. A storage-battery electrode including an integral dense die-compressed conductor or grid having openings within surrounding walls and two comb-like series of closely-grouped thin fingers having broader faces opposing each other and respectively projecting into said openings from their opposite marginal walls, and active material in the openings in contact with said fingers.

29. A storage-battery electrode including a conductor or grid having openings within surrounding walls and projections or fingers extending from said walls into the openings in the general plane of the electrode, that portion of each projection or finger at or near a central general plane of the electrode extending farthest into said openings, and active material closing the openings and entirely surrounding said projections or fingers.

30. An integral compressed storage-battery grid comprising conductive material having an interior molecular structure more dense than that of ordinary cast-lead and presenting a hard-finished exterior surface everywhere adapted to resist quick electrolytic disintegration, said grid having openings within surrounding walls and projections or fingers extending from said walls into the openings in the general plane of the grid, that portion of each projection or finger at or near a central general plane of the grid extending farthest into said openings.

31. A storage-battery electrode including an integral compressed conductor or grid having an interior molecular structure more dense than that of ordinary cast-lead and presenting a hard-finished exterior surface everywhere adapted to resist quick electrolytic disintegration, said conductor or grid having openings within surrounding walls and projections or fingers extending from said walls into the openings in the general plane of the electrode, that portion of each projection or finger at or near a central general plane of the electrode extending farthest into said openings, and active material in the openings in contact with said projections or fingers.

32. An integral dense die-compressed storage-battery conductor or grid having openings within surrounding walls and projections or fingers extending from said walls into the openings in the general plane of the conductor or grid, that portion of each projection or finger at or near a central general plane of the conductor or grid extending farthest into said openings.

33. A storage-battery electrode including an integral dense die-compressed conductor or grid having openings within surrounding walls and projections or fingers extending from said walls into the openings in the general plane of the electrode, that portion of each projection or finger at or near a central general plane of the electrode extending farthest into said openings, and active material in the openings in contact with said projections or fingers.

34. A storage-battery electrode including a conductor or grid having openings within surrounding walls and comb-like series of closely-grouped fine fingers projecting from said walls into the openings in the general plane of the electrode, that portion of each finger at or near a central general plane of the electrode extending farthest into said openings, and active material closing the openings and entirely surrounding said fingers.

35. An integral compressed storage-battery grid comprising conductive material having an interior molecular structure more dense than that of ordinary cast-lead and presenting a hard-finished exterior surface everywhere adapted to resist quick electrolytic disintegration, said grid having openings within surrounding walls and comb-like series of closely-grouped fine fingers projecting from said walls into the openings in the general plane of the grid, that portion of each finger at or near a central general plane of the grid extending farthest into said openings.

36. A storage-battery electrode including an integral compressed conductor or grid having an interior molecular structure more dense than that of ordinary cast-lead and presenting a hard-finished exterior surface everywhere adapted to resist quick electrolytic disintegration, said conductor or grid having openings within surrounding walls and comb-like series of closely-grouped fine fingers projecting from said walls into the openings in the general plane of the electrode, that portion of each finger at or near a central general plane of the electrode extending farthest into said openings, and active material in the openings in contact with said fingers.

37. An integral dense die-compressed storage-battery conductor or grid having openings within surrounding walls and comb-like series of closely-grouped fine fingers projecting from said walls into the openings in the general plane of the conductor or grid, that portion of each finger at or near a central general plane of the conductor or grid extending farthest into said openings.

38. A storage-battery electrode including an integral dense die-compressed conductor or grid having openings within surrounding walls and comb-like series of closely-grouped fine fingers projecting from said walls into the openings in the general plane of the electrode, that portion of each finger at or near a central general plane of the electrode extending farthest into said openings, and active material in the openings in contact with said fingers.

39. A storage-battery electrode including a conductor or grid having openings within surrounding walls and comb-like series of closely-grouped thin fingers having broader faces opposing each other and projecting from said walls into the openings in the general plane of the electrode, that portion of each finger at or near a central general plane of the electrode extending farthest into said openings, and active material closing the openings and entirely surrounding said fingers.

40. An integral compressed storage-battery grid comprising conductive material having an interior molecular structure more dense than that of ordinary cast-lead and presenting a hard-finished exterior surface everywhere adapted to resist quick electrolytic disintegration, said grid having openings within surrounding walls and comb-like series of closely-grouped thin fingers having broader faces opposing each other and projecting from said walls into the openings in the general plane of the grid, that portion of each finger at or near a central general plane of the grid extending farthest into said openings.

41. A storage-battery electrode including an integral compressed conductor or grid having an interior molecular structure more dense than that of ordinary cast-lead and presenting a hard-finished exterior surface everywhere adapted to resist quick electrolytic disintegration, said conductor or grid having openings within surrounding walls and comb-like series of closely-grouped thin fingers having broader faces opposing each other and projecting from said walls into the openings in the general plane of the electrode, that portion of each finger at or near a central general plane of the electrode extending farthest into said openings, and active material in the openings in contact with said fingers.

42. An integral dense die-compressed storage-battery conductor or grid having openings within surrounding walls and comb-like series of closely-grouped thin fingers having broader faces opposing each other and projecting from said walls into the openings in the general plane of the conductor or grid, that portion of each finger at or near a central general plane of the conductor or grid extending farthest into said openings.

43. A storage-battery electrode including an integral dense die-compressed conductor or grid having openings within surrounding walls and comb-like series of closely-grouped thin fingers having broader faces opposing each other and projecting from said walls into the openings in the general plane of the electrode, that portion of each finger at or near a central general plane of the electrode extending farthest into said openings, and active material in the openings in contact with said fingers.

44. A storage-battery electrode including a conductor or grid having openings within surrounding walls and two comb-like series of closely-grouped fine fingers respectively projecting into said openings from their opposite marginal walls in the general plane of the electrode, that portion of each finger at or near a central general plane of the electrode extending farthest into said openings, and active material closing the openings and entirely surrounding said fingers.

45. An integral compressed storage-battery grid comprising conductive material having an interior molecular structure more dense than that of ordinary cast-lead, and presenting a hard-finished exterior surface everywhere adapted to resist quick electrolytic disintegration, said grid having openings within surrounding walls and two comb-like series of closely-grouped fine fingers respectively projecting into said openings from their opposite marginal walls in the general plane of the grid, that portion of each finger at or near a central general plane of the grid extending farthest into said openings.

46. A storage-battery electrode including an integral compressed conductor or grid having an interior molecular structure more dense than that of ordinary cast-lead, and presenting a hard-finished exterior surface everywhere adapted to resist quick electrolytic disintegration, said conductor or grid having openings within surrounding walls and two comb-like series of closely-grouped fine fingers respectively projecting into said openings from their opposite marginal walls in the general plane of the electrode, that portion of each finger at or near a central general plane of the electrode extending farthest into said openings, and active material in the openings in contact with said fingers.

47. An integral dense die-compressed storage-battery conductor or grid having openings within surrounding walls and two comb-like series of closely-grouped fine fingers respectively projecting into said openings from their opposite marginal walls in the general plane of the conductor or grid, that portion of each finger at or near a central general plane of the conductor or grid extending farthest into said openings.

48. A storage-battery electrode including an integral dense die-compressed conductor or grid having openings within surrounding walls and two comb-like series of closely-grouped fine fingers respectively projecting into said openings from their opposite marginal walls in the general plane of the electrode, that portion of each finger at or near a central general plane of the electrode extending farthest into said openings, and active material in the openings in contact with said fingers.

49. A storage-battery electrode including a conductor or grid having openings within surrounding walls and two comb-like series of closely-grouped thin fingers having broader faces opposing each other and respectively projecting into said openings from their opposite marginal walls in the general plane of the electrode, that portion of each finger at or near a central general plane of the electrode extending farthest into said openings, and active material closing the openings and entirely surrounding said fingers.

50. An integral compressed storage-battery grid comprising conductive material having an interior molecular structure more dense than that of ordinary cast-lead, and presenting a hard-finished exterior surface everywhere adapted to resist quick electrolytic disintegration, said grid having openings within surrounding walls and two comb-like series of closely-grouped thin fingers having broader faces opposing each other and respectively projecting into said openings from their opposite marginal walls in the general plane of the grid, that portion of each finger at or near a central general plane of the grid extending farthest into said openings.

51. A storage-battery electrode including an integral compressed conductor or grid having an interior molecular structure more dense than that of ordinary cast-lead, and presenting a hard-finished exterior surface everywhere adapted to resist quick electrolytic disintegration, said conductor or grid having openings within surrounding walls and two comb-like series of closely-grouped thin fingers having broader faces opposing each other and respectively projecting into said openings from their opposite marginal walls in the general plane of the electrode, that portion of each finger at or near a central general plane of the electrode extending farthest into said openings, and active material in the openings in contact with said fingers.

52. An integral dense die-compressed storage-battery conductor or grid having openings within surrounding walls and two comb-like series of closely-grouped thin fingers having broader faces opposing each other and respectively projecting into said openings from their opposite marginal walls in the general plane of the conductor or grid, that portion of each finger at or near a central general plane of the conductor or grid extending farthest into said openings.

53. A storage-battery electrode including an integral dense die-compressed conductor or grid having openings within surrounding walls and two comb-like series of closely-grouped thin fingers having broader faces opposing each other and respectively projecting into said openings from their opposite marginal walls in the general plane of the electrode, that portion of each finger at or near a central general plane of the electrode extending farthest into said openings, and active material in the openings in contact with said fingers.

54. A storage-battery conductor or grid including strengthening-partitions forming openings and having projecting webs bordering the openings, and projections or fingers extending from the partitions and webs into said openings.

55. An integral dense die-compressed storage-battery conductor or grid including strengthening-partitions forming openings and having projecting webs bordering the openings, and projections or fingers extending from the partitions and webs into said openings.

56. A storage-battery conductor or grid including strengthening-partitions forming openings and having projecting webs bordering the openings, and comb-like series of closely-grouped fine fingers projecting from the partitions and webs into said openings.

57. An integral dense die-compressed storage-battery conductor or grid including strengthening-partitions forming openings and having projecting webs bordering the openings, and comb-like series of closely-grouped fine fingers projecting from the partitions and webs into said openings.

58. A storage-battery conductor or grid including strengthening-partitions forming openings and having projecting webs bordering the openings, and comb-like series of closely-grouped thin fingers having broader faces opposing each other and projecting from the partitions and webs into said openings.

59. An integral dense die-compressed storage-battery conductor or grid including strengthening-partitions forming openings and having projecting webs bordering the openings, and comb-like series of closely-grouped thin fingers having broader faces opposing each other and projecting from the partitions and webs into said openings.

60. A storage-battery conductor or grid including strengthening-partitions forming openings and having projecting webs bordering the openings, and two comb-like series of closely-grouped fine fingers respectively projecting from the partitions and webs into said openings from their opposite marginal walls.

61. An integral dense die-compressed storage-battery conductor or grid including strengthening-partitions forming openings and having projecting webs bordering the openings, and two comb-like series of closely-grouped fine fingers respectively projecting from the partitions and webs into said openings from their opposite marginal walls.

62. A storage-battery conductor or grid including strengthening-partitions forming openings and having projecting webs bordering the openings, and two comb-like series of closely-grouped thin fingers having broader faces opposing each other and respectively projecting from the partitions and webs into said openings from their opposite marginal walls.

63. An integral dense die-compressed storage-battery conductor or grid including strengthening-partitions forming openings and having projecting webs bordering the openings, and two comb-like series of closely-grouped thin fingers having broader faces opposing each other and respectively projecting from the partitions and webs into said openings from their opposite marginal walls.

64. A storage-battery conductor or grid including strengthening-partitions dividing it into sections and having projecting webs bordering said sections, each section being subdivided by partitions into small openings, and projections or fingers extending from the partitions and webs into said openings.

65. A storage-battery conductor or grid including strengthening-partitions dividing it into sections and having projecting webs bordering said sections, each section being subdivided by partitions into small openings, and comb-like series of closely-grouped fine fingers projecting from the partitions and webs into said openings.

66. A storage-battery conductor or grid including strengthening-partitions dividing it into sections and having projecting webs bordering said sections, each section being subdivided by partitions into small openings, and comb-like series of closely-grouped thin fingers having broader faces opposing each other and projecting from the partitions and webs into said openings.

67. A storage-battery conductor or grid including strengthening-partitions dividing it into sections and having projecting webs bordering said sections, each section being subdivided by partitions into small openings, and two comb-like series of closely-grouped fine fingers respectively projecting from the partitions and webs into said openings from their opposite marginal walls.

68. A storage-battery conductor or grid including strengthening-partitions dividing it into sections and having projecting webs bordering said sections, each section being subdivided by partitions into small openings, and two comb-like series of closely-grouped thin fingers having broader faces opposing each other and respectively projecting from the partitions and webs into said openings from their opposite marginal walls.

69. A storage-battery electrode including a conductor or grid having strengthening-partitions forming openings and provided with projecting webs bordering the openings and projections or fingers extending from the partitions and webs into said openings, and active material in the openings in contact with said projections or fingers.

70. A storage-battery electrode including an integral dense die-compressed conductor or grid having strengthening-partitions forming openings and provided with projecting webs bordering the openings and projections or fingers extending from the partitions and webs into said openings, and active material in the openings in contact with said projections or fingers.

71. A storage-battery electrode including a conductor or grid having strengthening-partitions forming openings and provided with projecting webs bordering the openings and comb-like series of closely-grouped fine fingers projecting from the partitions and webs into said openings, and active material in the openings in contact with said fingers.

72. A storage-battery electrode including an integral dense die-compressed conductor or grid having strengthening-partitions forming openings and provided with projecting webs bordering the openings and comb-like series of closely-grouped fine fingers projecting from the partitions and webs into said openings, and active material in the openings in contact with said fingers.

73. A storage-battery electrode including a conductor or grid having strengthening-partitions forming openings and provided with projecting webs bordering the openings and comb-like series of closely-grouped thin fingers having broader faces opposing each other and projecting from the partitions and webs into said openings, and active material in the openings in contact with said fingers.

74. A storage-battery electrode including an integral dense die-compressed conductor or grid having strengthening-partitions forming openings and provided with projecting webs bordering the openings and comb-like series of closely-grouped thin fingers having broader faces opposing each other and projecting from the partitions and webs into said openings, and active material in the openings in contact with said fingers.

75. A storage-battery electrode including a conductor or grid having strengthening-partitions forming openings and provided with projecting webs bordering the openings and two comb-like series of closely-grouped fine fingers respectively projecting from the partitions and webs into said openings from their opposite marginal walls, and active material in the openings in contact with said fingers.

76. A storage-battery electrode including an integral dense die-compressed conductor or grid having strengthening-partitions forming openings and provided with projecting webs bordering the openings and two comb-like series of closely-grouped fine fingers respectively projecting from the partitions and webs into said openings from their opposite marginal walls, and active material in the openings in contact with said fingers.

77. A storage-battery electrode including a conductor or grid having strengthening-partitions forming openings and provided with projecting webs bordering the openings and two comb-like series of closely-grouped thin fingers having broader faces opposing each other and respectively projecting from the partitions and webs into said openings from their opposite marginal walls, and active material in the openings in contact with said fingers.

78. A storage-battery electrode including an integral dense die-compressed conductor or grid having strengthening-partitions forming openings and provided with projecting webs bordering the openings and two comb-like series of closely-grouped thin fingers having broader faces opposing each other and respectively projecting from the partitions and webs into said openings from their opposite marginal walls, and active material in the openings in contact with said fingers.

79. A storage-battery electrode including a conductor or grid having strengthening-partitions dividing it into sections and provided with projecting webs bordering the sections, each section being subdivided by partitions into small openings, projections or fingers extending from the partitions and webs into the openings, and active material in the openings in contact with said projections or fingers.

80. A storage-battery electrode including a conductor or grid having strengthening-partitions dividing it into sections and provided with projecting webs bordering the sections, each section being subdivided by partitions into small openings, comb-like series of closely-grouped fine fingers projecting from the partitions and webs into the openings, and active material in the openings in contact with said fingers.

81. A storage-battery electrode including a conductor or grid having strengthening-partitions dividing it into sections and provided with projecting webs bordering the sections, each section being subdivided by partitions into small openings, comb-like series of closely-grouped thin fingers having broader faces opposing each other and projecting from the partitions and webs into the openings, and active material in the openings in contact with said fingers.

82. A storage-battery electrode including a conductor or grid having strengthening-partitions dividing it into sections and provided with projecting webs bordering the sections, each section being subdivided by partitions into small openings, two comb-like series of closely-grouped fine fingers respectively projecting from the partitions and webs into the openings from their opposite marginal walls, and active material in the openings in contact with said fingers.

83. A storage-battery electrode including a conductor or grid having strengthening-partitions dividing it into sections and provided with projecting webs bordering the sections, each section being subdivided by partitions into small openings, two comb-like series of closely-grouped thin fingers having broader faces opposing each other and respectively projecting from the partitions and webs into the openings from their opposite marginal walls, and active material in the openings in contact with said fingers.

84. A storage-battery electrode including a conductor or grid having strengthening-partitions forming openings and provided with projecting webs bordering the openings and projections or fingers extending from the partitions and webs into the openings in the general plane of the electrode, that portion of each projection or finger at or near a central general plane of the electrode extending farthest into said openings, and active material in the openings in contact with said projections or fingers.

85. A storage-battery electrode including an integral dense die-compressed conductor or grid having strengthening-partitions forming openings and provided with projecting webs bordering the openings and projections or fingers extending from the partitions and webs into the openings in the general plane of the electrode, that portion of each projection or finger at or near a central general plane of the electrode extending farthest into said openings, and active material in the openings in contact with said projections or fingers.

86. A storage-battery electrode including a conductor or grid having strengthening-partitions forming openings and provided with projecting webs bordering the openings and comb-like series of closely-grouped fine fingers projecting from the partitions and webs into the openings in the general plane of the electrode, that portion of each finger at or near a central general plane of the electrode extending farthest into said openings, and active material in the openings in contact with said fingers.

87. A storage-battery electrode including an integral dense die-compressed conductor or grid having strengthening-partitions forming openings and provided with projecting webs bordering the openings and comb-like series of closely-grouped fine fingers projecting from the partitions and webs into the openings in the general plane of the electrode, that portion of each finger at or near a central general plane of the electrode extending farthest into said openings, and active material in the openings in contact with said fingers.

88. A storage-battery electrode including a conductor or grid having strengthening-partitions forming openings and provided with projecting webs bordering the openings and comb-like series of closely-grouped thin fingers having broader faces opposing each other and projecting from the partitions and webs into the openings in the general plane of the electrode, that portion of each finger at or near a central general plane of the electrode extending farthest into said openings, and active material in the openings in contact with said fingers.

89. A storage-battery electrode including an integral dense die-compressed conductor or grid having strengthening-partitions forming openings and provided with projecting webs bordering the openings and comb-like series of closely-grouped thin fingers having broader faces opposing each other and projecting from the partitions and webs into the openings in the general plane of the electrode, that portion of each finger at or near a central general plane of the electrode extending farthest into said openings, and active material in the openings in contact with said fingers.

90. A storage-battery electrode including a conductor or grid having strengthening-partitions forming openings and provided with projecting webs bordering the openings and two comb-like series of closely-grouped fine fingers respectively projecting from the partitions and webs into the openings from their opposite marginal walls in the general plane of the electrode, that portion of each finger at or near a central general plane of the electrode extending farthest into said openings, and active material in the openings in contact with said fingers.

91. A storage-battery electrode including an integral dense die-compressed conductor or grid having strengthening-partitions forming openings and provided with projecting webs bordering the openings and two comb-like series of closely-grouped fine fingers respectively projecting from the partitions and webs into the openings from their opposite marginal walls in the general plane of the electrode, that portion of each finger at or near a central general plane of the electrode extending farthest into said openings, and active material in the openings in contact with said fingers.

92. A storage-battery electrode including a conductor or grid having strengthening-partitions forming openings and provided with projecting webs bordering the openings and two comb-like series of closely-grouped thin fingers having broader faces opposing each other and respectively projecting from the partitions and webs into the openings from their opposite marginal walls in the general plane of the electrode, that portion of each finger at or near a central general plane of the electrode extending farthest into said openings, and active material in the openings in contact with said fingers.

93. A storage-battery electrode including an integral dense die-compressed conductor or grid having strengthening-partitions forming openings and provided with projecting webs bordering the openings and two comb-like series of closely-grouped thin fingers having broader faces opposing each other and respectively projecting from the partitions and webs into the openings from their opposite marginal walls in the general plane of the electrode, that portion of each finger at or near a central general plane of the electrode extending farthest into said openings, and active material in the openings in contact with said fingers.

94. A storage-battery electrode including a conductor or grid having strengthening-partitions dividing it into sections and provided with projecting webs bordering the sections, each section being subdivided by partitions into small openings, projections or fingers extending from the partitions and webs into the openings in the general plane of the electrode, that portion of each projection or finger at or near a central general plane of the electrode extending farthest into said openings, and active material in the openings in contact with said projections or fingers.

95. A storage-battery electrode including a conductor or grid having strengthening-partitions dividing it into sections and provided with projecting webs bordering the sections, each section being subdivided by partitions into small openings, comb-like series of closely-grouped fine fingers projecting from the partitions and webs into the openings in the general plane of the electrode, that portion of each finger at or near a central general plane of the electrode extending farthest into said openings, and active material in the openings in contact with said fingers.

96. A storage-battery electrode including a conductor or grid having strengthening-partitions dividing it into sections and provided with projecting webs bordering the sections, each section being subdivided by partitions into small openings, comb-like series of closely-grouped thin fingers having broader faces opposing each other and projecting from the partitions and webs into the openings in the general plane of the electrode, that portion of each finger at or near a central general plane of the electrode extending farthest into said openings, and active material in the openings in contact with said fingers.

97. A storage-battery electrode including a conductor or grid having strengthening-partitions dividing it into sections and provided with projecting webs bordering the sections, each section being subdivided by partitions into small openings, two comb-like series of closely-grouped fine fingers respectively projecting from the partitions and webs into the openings from their opposite marginal walls in the general plane of the electrode, that portion of each finger at or near a central general plane of the electrode extending farthest into said openings, and active material in the openings in contact with said fingers.

98. A storage-battery electrode including a conductor or grid having strengthening-partitions dividing it into sections and provided with projecting webs bordering the sections, each section being subdivided by partitions into small openings, two comb-like series of closely-grouped thin fingers having broader faces opposing each other and respectively projecting from the partitions and webs into the openings from their opposite marginal walls in the general plane of the electrode, that portion of each finger at or near a central general plane of the electrode extending farthest into said openings, and active material in the openings in contact with said fingers.

99. A storage-battery electrode including a conductor or grid having strengthening-partitions forming openings and provided with projecting webs bordering the openings, projections or fingers extending from the partitions and webs into the openings, active material in the openings in contact with said projections or fingers, and retainers held to the projecting webs and overlying the active material.

100. A storage-battery electrode including a conductor or grid having strengthening-partitions dividing it into sections and provided with projecting webs bordering the sections, each section being subdivided by partitions into small openings, projections or fingers extending from the partitions and webs into the openings, active material in the openings in contact with said projections or fingers, and retainers held to the projecting webs and overlying the active material.

101. A storage-battery electrode including a conductor or grid having strengthening-partitions forming openings and provided with projecting webs bordering the openings, projections or fingers extending from the partitions and webs into the openings in the general plane of the electrode, that portion of each projection or finger at or near a central general plane of the electrode extending farthest into the openings, active material in the openings in contact with said projections or fingers, and retainers held to the projecting webs and overlying the active material.

102. A storage-battery electrode including a conductor or grid having strengthening-partitions dividing it into sections and provided with projecting webs bordering the sections, each section being subdivided by partitions into small openings, projections or fingers extending from the partitions and webs into the openings in the general plane of the electrode, that portion of each projection or finger at or near a central general plane of the electrode extending farthest into said openings, active material in the openings in contact with said projections or fingers, and retainers held to the projecting webs and overlying the active material.

103. A storage-battery electrode including a conductor or grid having strengthening-partitions forming openings and provided with projecting webs bordering the openings within which active material may be placed or produced, and retainers for the active material having inbent flanges fitting the bordering webs of said openings.

104. A storage-battery electrode having conductive portions provided with openings and projections or fingers extending into the openings in the general plane of the electrode, that portion of each projection or finger at or near a central general plane of the electrode extending farthest into said openings, and active material in the openings surrounding the projections or fingers and facially corrugated to provide a comparatively thin body of it along the edges of the projections or fingers thereby promoting full conductivity between said projections or fingers and the active material and the electrolyte.

105. A storage-battery electrode having conductive portions provided with openings and projections or fingers extending into the openings in the general plane of the electrode, that portion of each projection or finger at or near a central general plane of the electrode extending farthest into said openings, active material in the openings surrounding the projections or fingers and facially corrugated to provide a comparatively thin body of it along the edges of the projections or fingers thereby promoting full conductivity between said projections or fingers and the active material and the electrolyte, and correspondingly-corrugated retainers held outside of the active material.

106. A storage battery comprising two or more operatively-coupled electrodes each including a conductor or grid having strengthening-partitions forming openings and provided with projecting webs bordering the openings within which active material may be placed or produced, retainers for the active material overlying the bordering webs of said openings, and separators spacing adjoining electrodes and also overlocking the retainers.

ALBERT FRANKLIN MADDEN.

Witnesses:
ARTHUR L. STEVENS,
ALBERT J. DOTY.